US012393134B2

(12) United States Patent
Sueshige et al.

(10) Patent No.: US 12,393,134 B2
(45) Date of Patent: Aug. 19, 2025

(54) MOVABLE MEMBER AND IMAGE FORMING APPARATUS

(71) Applicant: CANON KABUSHIKI KAISHA, Tokyo (JP)

(72) Inventors: Kazutaka Sueshige, Shizuoka (JP); Daisuke Abe, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/598,049

(22) Filed: Mar. 7, 2024

(65) Prior Publication Data

US 2024/0319631 A1 Sep. 26, 2024

Related U.S. Application Data

(62) Division of application No. 18/321,168, filed on May 22, 2023, now Pat. No. 11,988,974, which is a (Continued)

(30) Foreign Application Priority Data

Oct. 14, 2020 (JP) ................................ 2020-173317

(51) Int. Cl.
*G03G 15/02* (2006.01)
*G03G 15/04* (2006.01)
*G03G 15/08* (2006.01)

(52) U.S. Cl.
CPC ..... *G03G 15/0225* (2013.01); *G03G 15/0291* (2013.01); *G03G 15/0409* (2013.01); *G03G 15/0872* (2013.01)

(58) Field of Classification Search
CPC ........... G03G 15/0225; G03G 15/0291; G03G 15/0409; G03G 15/0872
See application file for complete search history.

(56) References Cited

U.S. PATENT DOCUMENTS 4,788,573 A 11/1988 Nakaoka et al.
8,265,515 B2 * 9/2012 Ishii .................. G03G 15/0225 399/111

(Continued)

FOREIGN PATENT DOCUMENTS

CN 104428722 A 3/2015
CN 105068395 A 11/2015

(Continued)

OTHER PUBLICATIONS

Office Action dated Apr. 2, 2024, in Japanese Patent Application No. 2023-103930.
Office Action dated Apr. 4, 2023, in Japanese Patent Application No. 2020-173317.
Search Report dated Feb. 24, 2022, in European Patent Application No. 21197601.4.

(Continued)

*Primary Examiner* — Walter L Lindsay, Jr.
*Assistant Examiner* — Milton Gonzalez
(74) *Attorney, Agent, or Firm* — Venable LLP

(57) ABSTRACT

A movable member includes a frame, a mounting portion, a rotatable image bearing member, a charging member, and a cleaning member. The cleaning member includes a base portion including a first surface positioned on one side of the frame, a second surface positioned on the other side of the frame, and a third surface, and includes a projected portion. The projected portion includes a first side surface positioned on the aforementioned the other side and a second side surface positioned on the aforementioned one side. The first side surface is positioned between the first surface and the second surface. The first side surface constitutes an end surface of the projected portion on the aforementioned the other side with respect to the axial direction, and the second side surface constitutes an end surface of the projected portion on the aforementioned one side with respect to the axial direction.

10 Claims, 13 Drawing Sheets

Related U.S. Application Data division of application No. 17/475,672, filed on Sep. 15, 2021, now Pat. No. 11,703,774.

(56) References Cited

U.S. PATENT DOCUMENTS

| | | | | |
|---|---|---|---|---|
| 8,369,734 | B2 | 2/2013 | Shimizu et al. | |
| 8,923,711 | B2 | 12/2014 | Handa | |
| 8,989,623 | B2 | 3/2015 | Koishi et al. | |
| 2004/0013443 | A1 | 1/2004 | Itoh et al. | |
| 2010/0296835 | A1 | 11/2010 | Itabashi | |
| 2011/0020029 | A1 * | 1/2011 | Takahashi .......... | G03G 15/0291 399/100 |
| 2013/0164023 | A1 | 6/2013 | Shimizu et al. | |
| 2014/0294431 | A1 | 10/2014 | Yoshizumi et al. | |
| 2021/0294259 | A1 | 9/2021 | Shiina et al. | |

FOREIGN PATENT DOCUMENTS

| | | | |
|---|---|---|---|
| JP | 2002-214994 | A | 7/2002 |
| JP | 2013-076925 | A | 4/2013 |
| JP | 2016-191812 | A | 11/2016 |
| JP | 2017-116852 | A | 6/2017 |
| WO | 2014/010130 | A1 | 1/2014 |
| WO | 2017/110181 | A1 | 6/2017 |

OTHER PUBLICATIONS

Communication dated Feb. 15, 2024, in European Patent Application No. 21197601.4.

Office Action dated Mar. 20, 2025, in Chinese Patent Application No. 202111184716.8.

* cited by examiner (a)

(b)

(a)

(b)

MOVABLE MEMBER AND IMAGE FORMING APPARATUS

This is a divisional of U.S. patent application Ser. No. 18/321,168, filed May 22, 2023, which is a divisional of U.S. patent application Ser. No. 17/475,672, filed Sep. 15, 2021, now U.S. Pat. No. 11,703,774.

FIELD OF THE INVENTION AND RELATED ART

The present invention relates an image forming apparatus and a movable member used in the image forming apparatus. Particularly, the present invention relates to an electrophotographic image forming apparatus employing an electrophotographic type and a movable member used in the electrophotographic image forming apparatus.

Conventionally, an image forming apparatus in which a developing cartridge with a particular specification is mountable and in which a developing cartridge with a specification different from the particular specification is not mountable has been proposed.

In Japanese laid-Open Patent Application (JP-A) 2017-116852, a cleaning member movable by being operated by a user is provided, along an axial direction (rotational axis direction) of a photosensitive drum, in a pulling-out member movable between an (inside) mounting position and an (outside) pulling-out position relative to the image forming apparatus. The cleaning member is capable of cleaning a charging member for electrically charging the photosensitive drum.

Incidentally, the cleaning member in JP-A 2017-116852 further includes a projected portion, and when the cartridge with the different specification is being mounted, the projected portion and the developing cartridge are in contact with each other, so that the developing cartridge is not mounted in the pulling-out member. On the other hand, when the developing cartridge with the particular specification corresponding to the pulling-out member is being mounted, the projected portion enters a predetermined recessed portion of the developing cartridge, so that the developing cartridge is mounted in the pulling-out member.

However, the cleaning member in JP-A 2017-116852 is provided close to a charging member, and when the user performs a moving operation of the charging member, the user erroneously contacts also the charging member in some cases, so that there was a possibility that the contact of the user with the charging member has the influence on a charging performance of the charging member.

SUMMARY OF THE INVENTION

In view of the aforementioned problem, a principal object of the present invention is to provide a movable member and an image forming apparatus which are capable of alleviating a risk of contact with a charging member when a user operates a cleaning member.

According to an aspect of the present invention, there is provided a movable member movable between a first position inside an image forming apparatus and a second position where the movable member is pulled out to an outside of the image forming apparatus, while mounting a cartridge provided with a predetermined recessed portion, the movable member comprising: a frame; a mounting portion provided in the frame and permitting mounting and dismounting of the cartridge; a rotatable image bearing member provided in the frame; a charging member provided in the frame and configured to electrically charge a surface of the image bearing member, the charging member extending along an axial direction of a rotation shaft of the image bearing member; and a cleaning member provided in the frame and configured to clean the charging member by being disposed close to the charging member, the cleaning member being movable between an end portion of the frame on one side with respect to the axial direction and an end portion of the frame on the other side with respect to the axial direction, wherein the cleaning member comprises: a base portion including a first surface positioned on the one side and crossing the axial direction, a second surface positioned on the can alleviate other side and crossing the axial direction, and a third surface positioned between the first surface and the second surface; and a projected portion projected from the third surface toward an outside and capable of entering the predetermined recessed portion when the cartridge is mounted in the mounting portion in a state in which the cleaning member is positioned at the end portion on the one side of the frame, wherein the projected portion includes a first side surface crossing the axial direction and positioned on the can alleviate other side and a second side surface crossing the axial direction and positioned on the one side, wherein the first side surface is positioned between the first surface and the second surface, and wherein the first side surface constitutes an end surface of the projected portion on the other side with respect to the axial direction, and the second side surface constitutes an end surface of the projected portion on the one side with respect to the axial direction.

Further features of the present invention will become apparent from the following description of exemplary embodiments with reference to the attached drawings.

Figure 2:
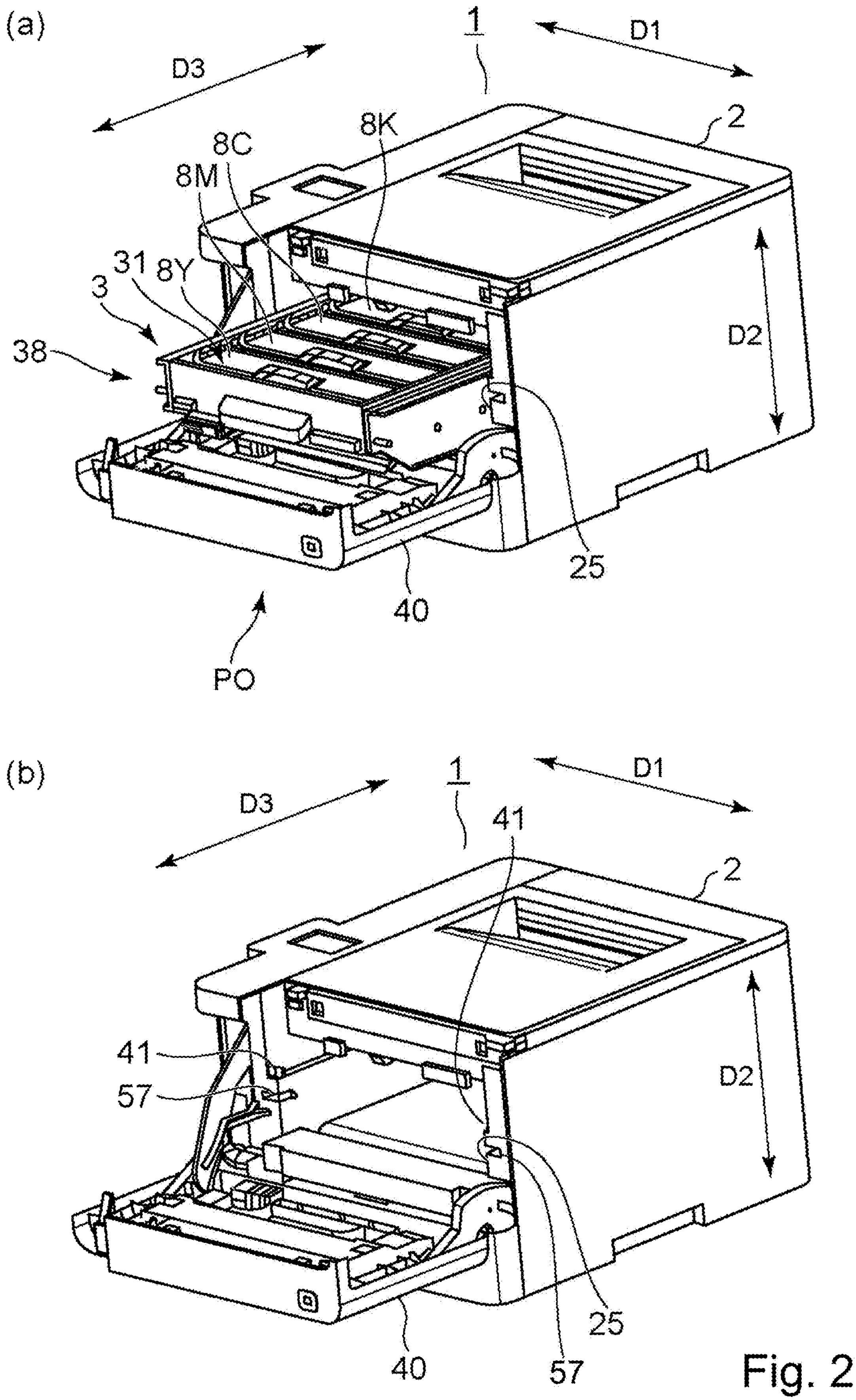

Part (a) of FIG. 2 is a schematic perspective view of the image forming apparatus according to the embodiment of the present invention, and part (b) of FIG. 2 is a schematic perspective view of the image forming apparatus in a state in which a cartridge tray is dismounted from the image forming apparatus.

Figure 3:
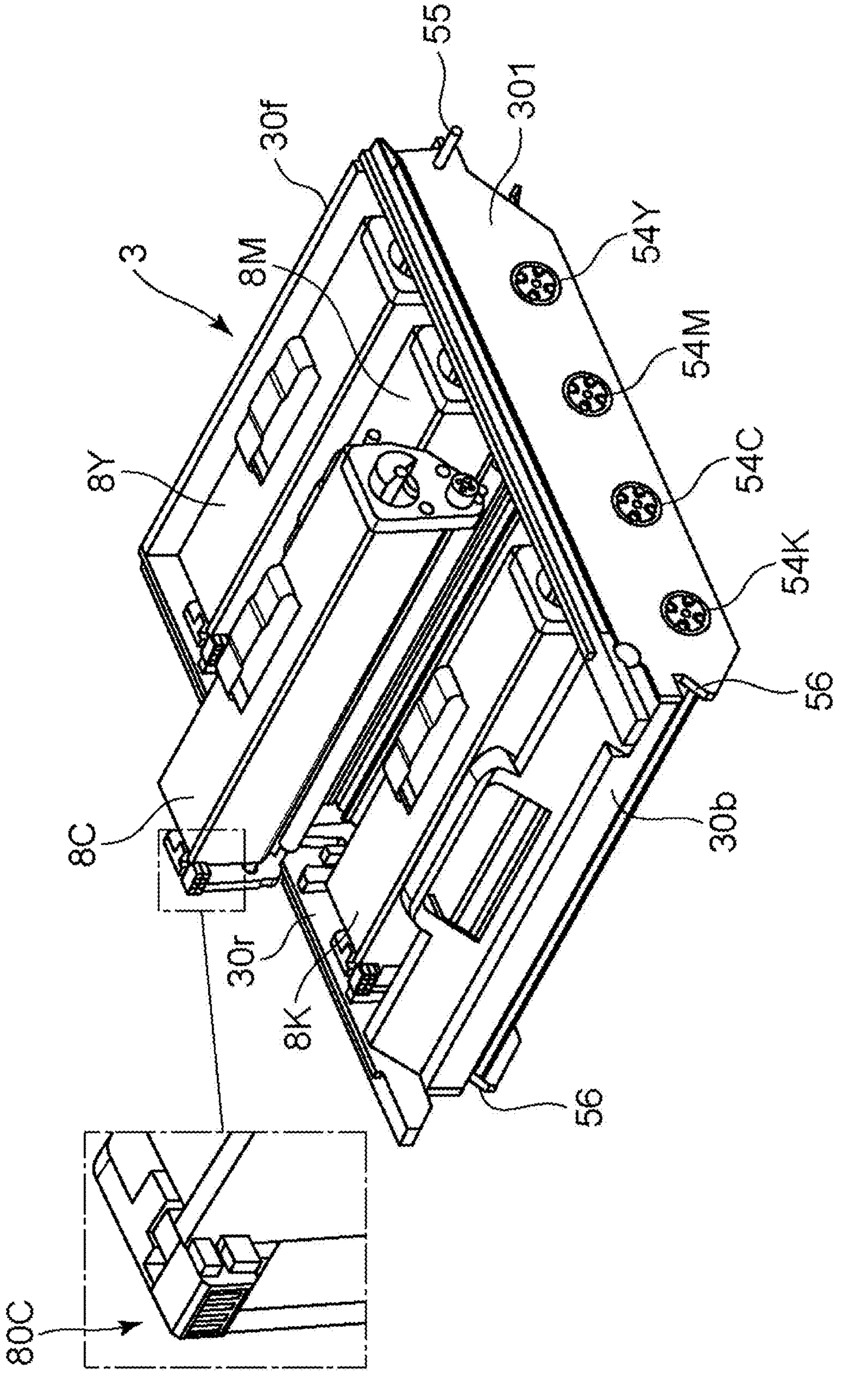

FIG. 3 is a schematic perspective view of the cartridge tray and a developing cartridge in the embodiment of the present invention.

Figure 4:
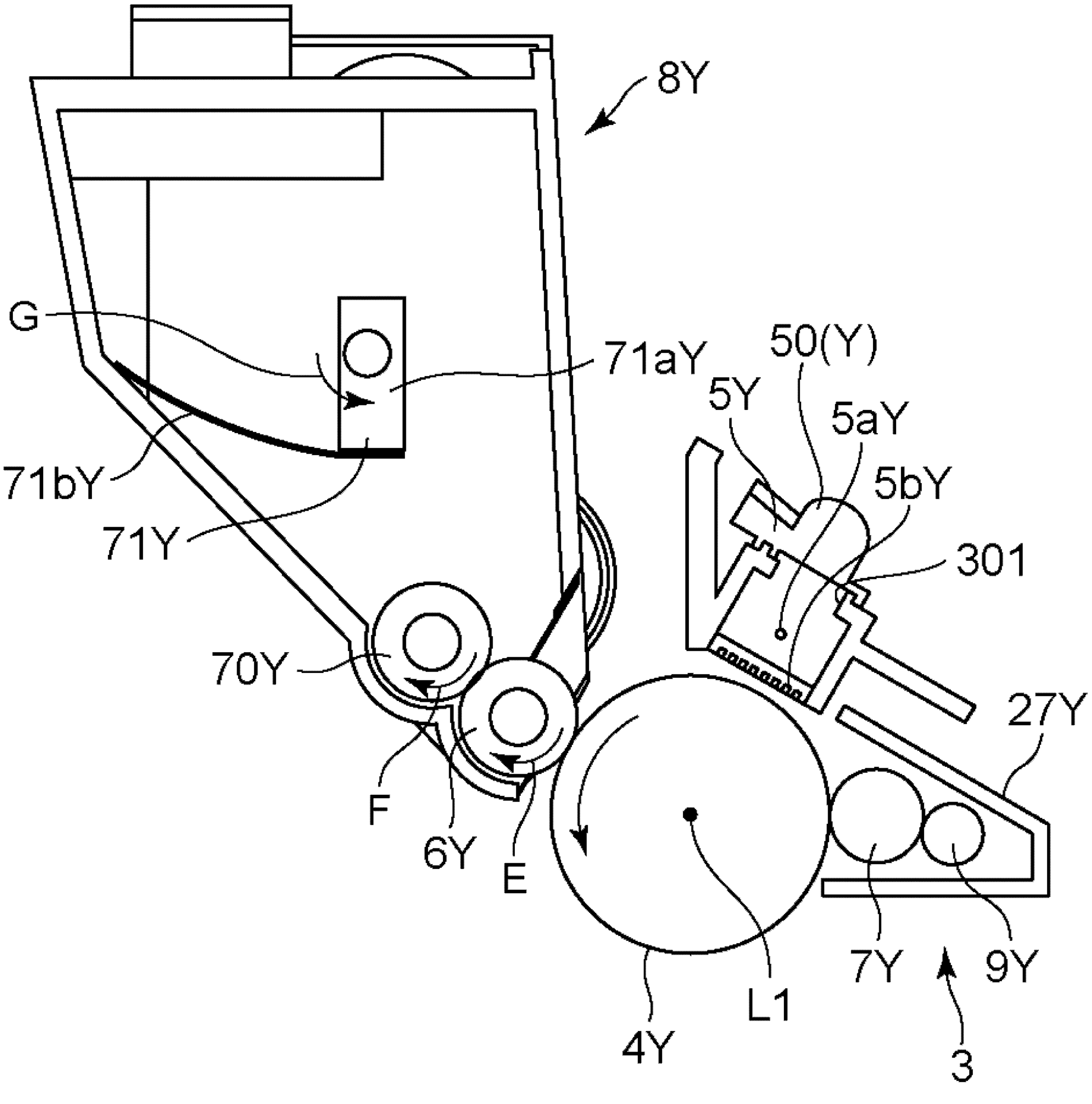

FIG. 4 is a schematic sectional view of the cartridge tray and the developing cartridge in the embodiment of the present invention.

Figure 5:
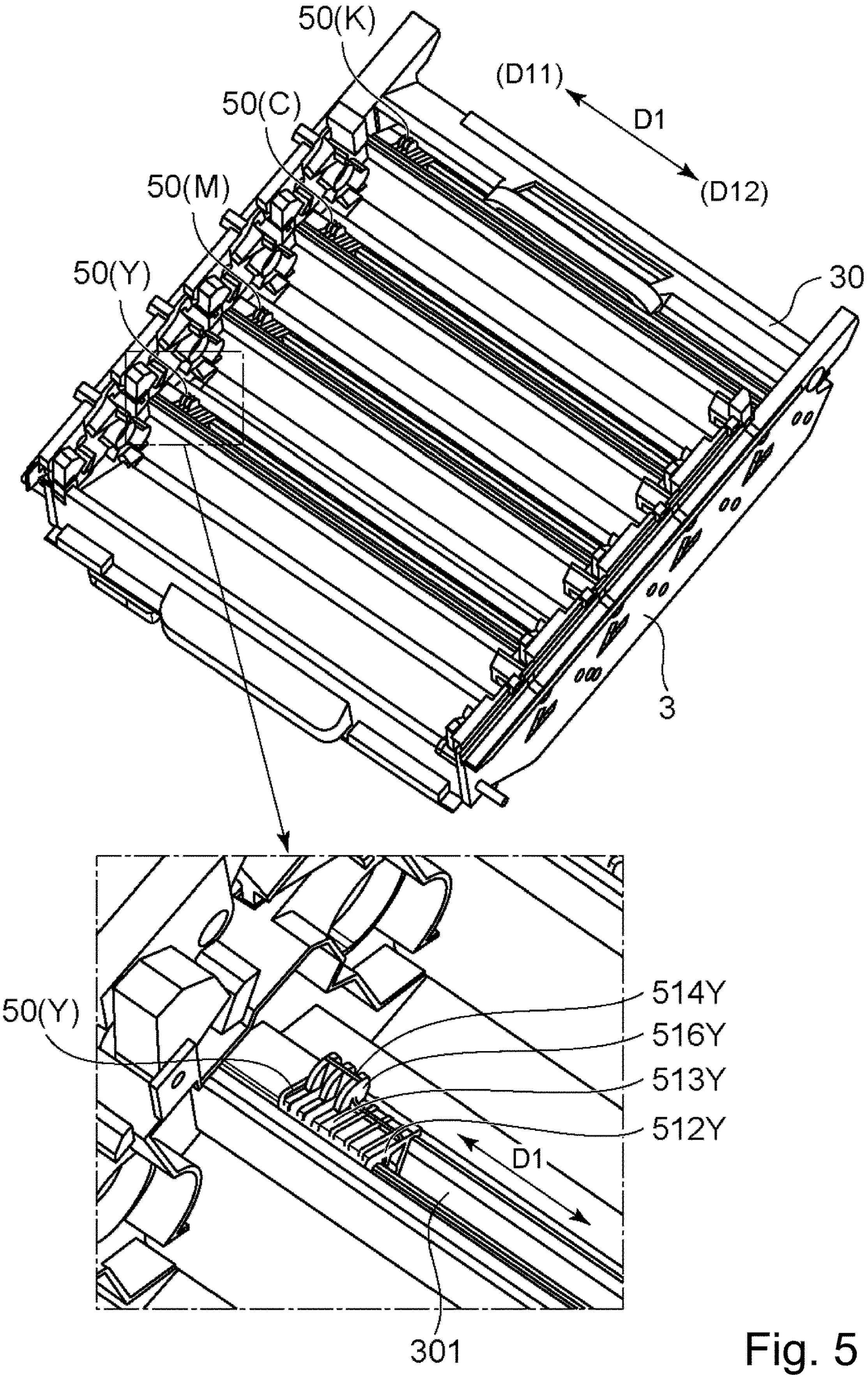

FIG. 5 is a schematic perspective view of the cartridge tray and a (partially enlarged) cleaning member in the embodiment of the present invention.

Figure 6:
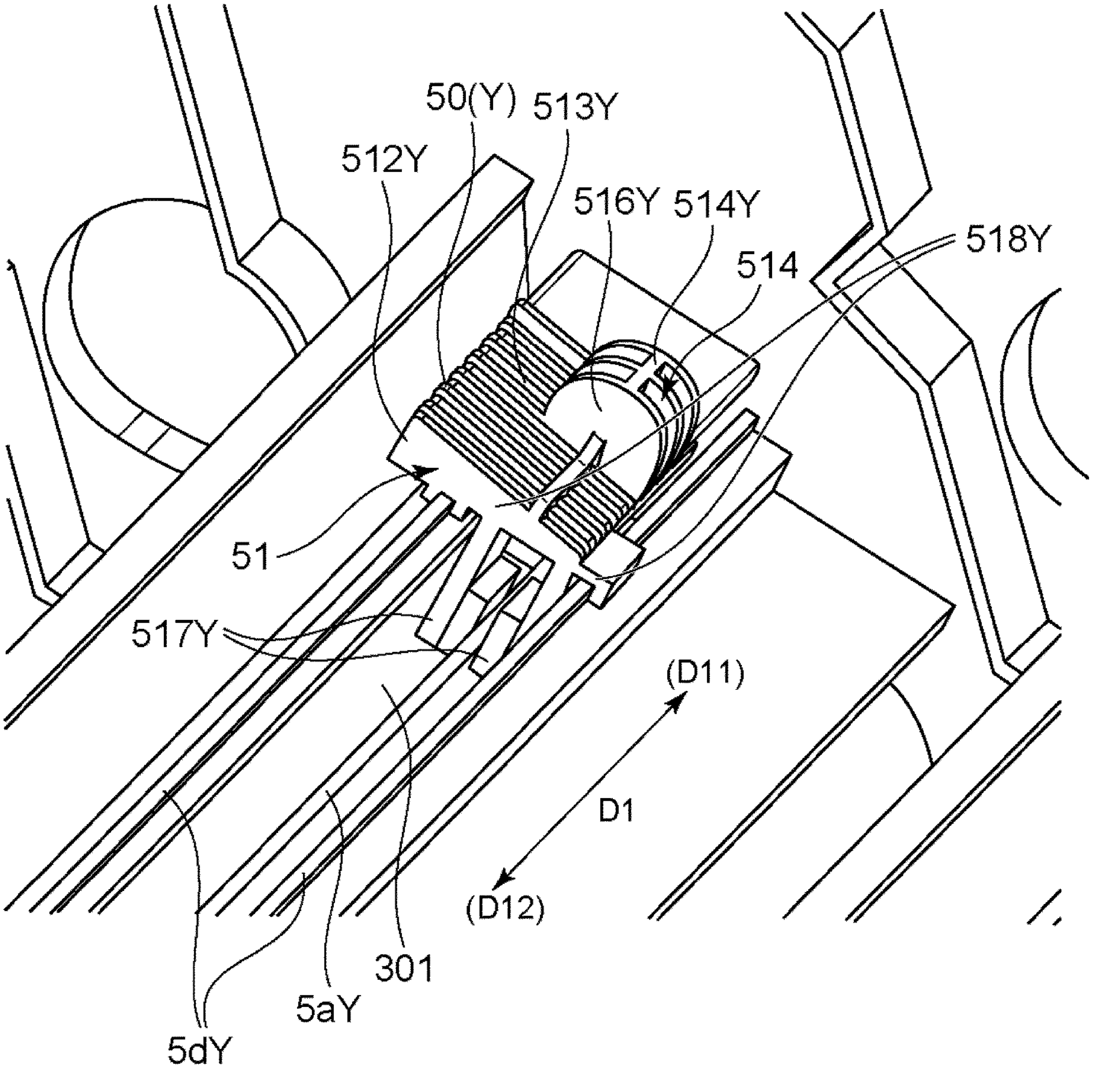

FIG. 6 is a schematic perspective view of a charging member and the cleaning member in the embodiment of the present invention.

Figure 7:
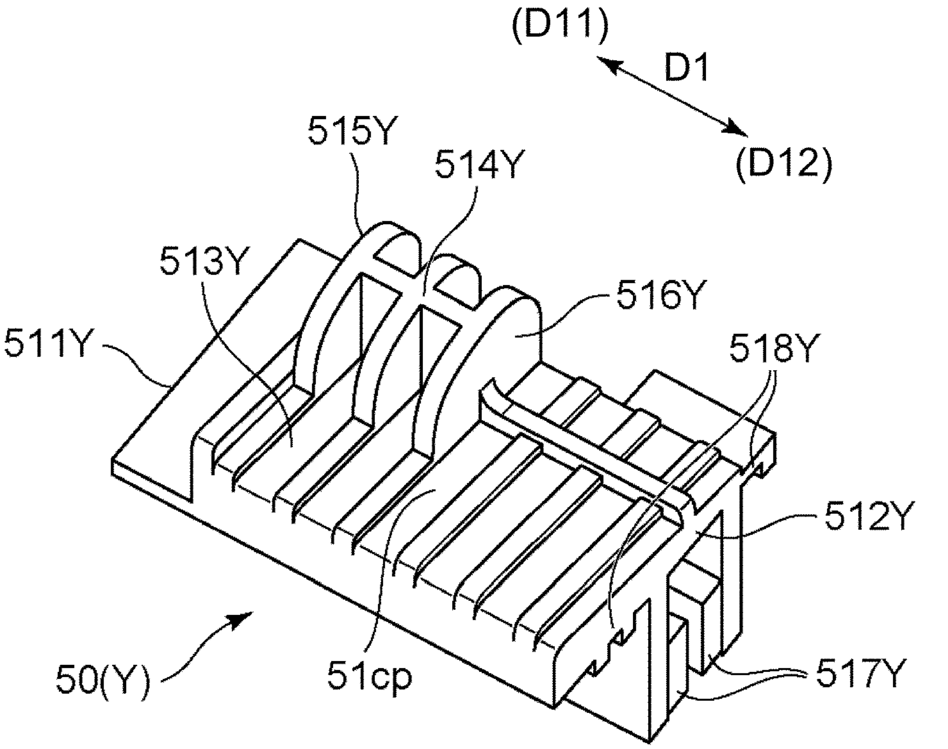
Figure 7:
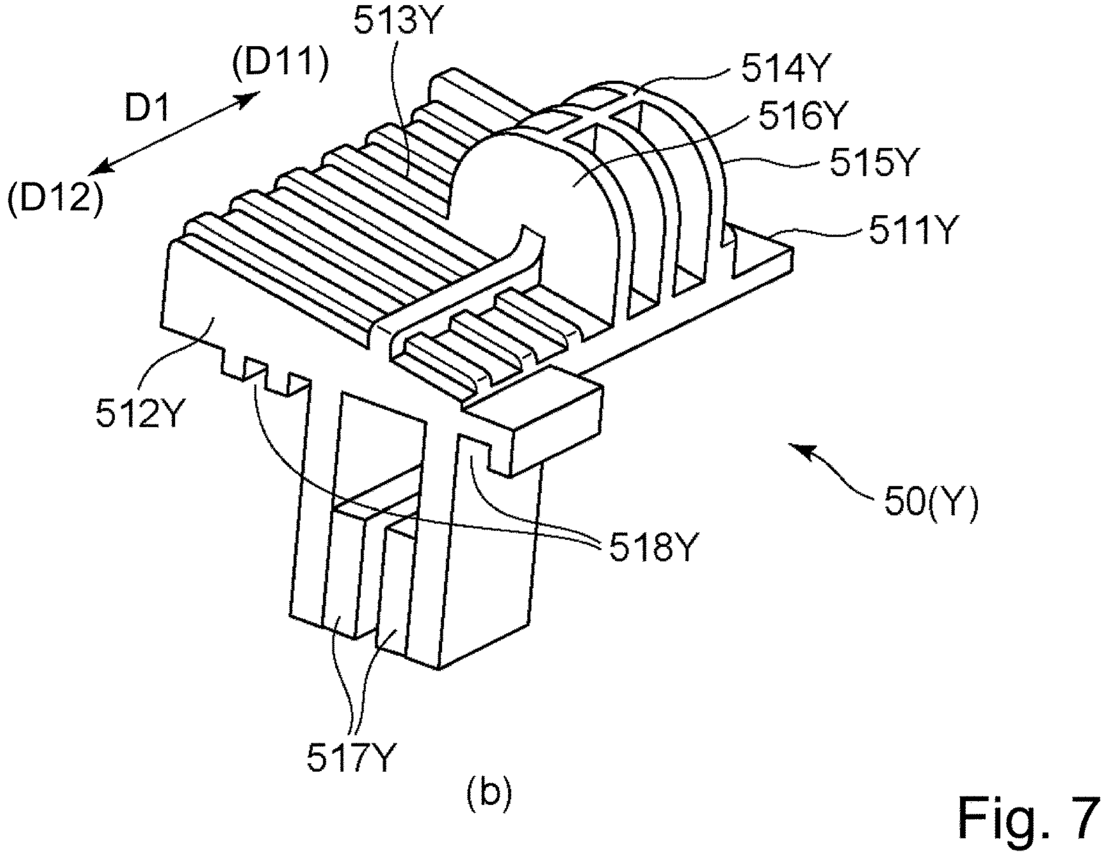

Parts (a) and (b) of FIG. 7 are schematic perspective views of the cleaning member in the embodiment of the present invention.

Figure 8:
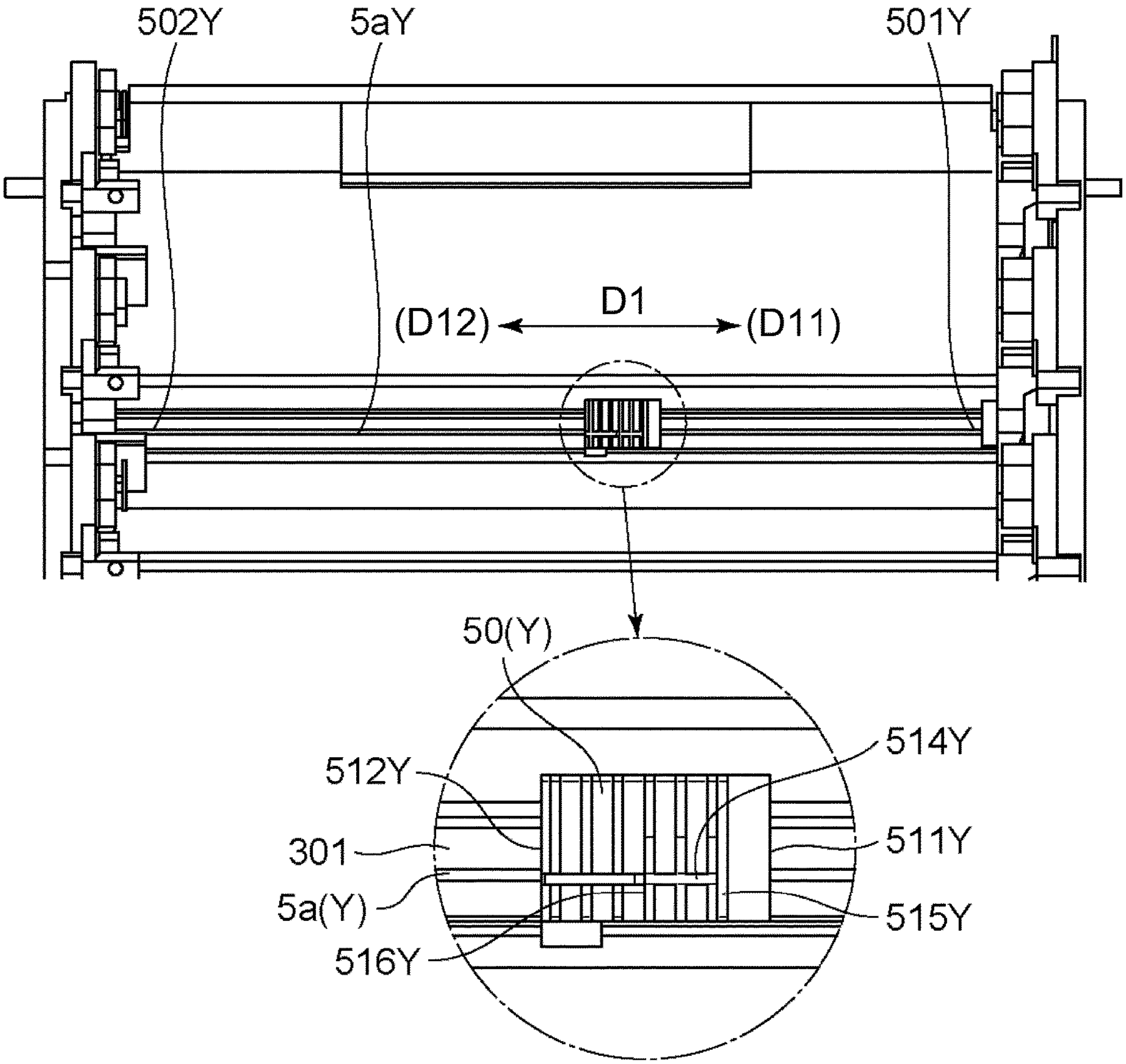

FIG. 8 is a schematic top (plan) view of the cartridge tray and the (partially enlarged) cleaning member in the embodiment of the present invention.

Figure 9:
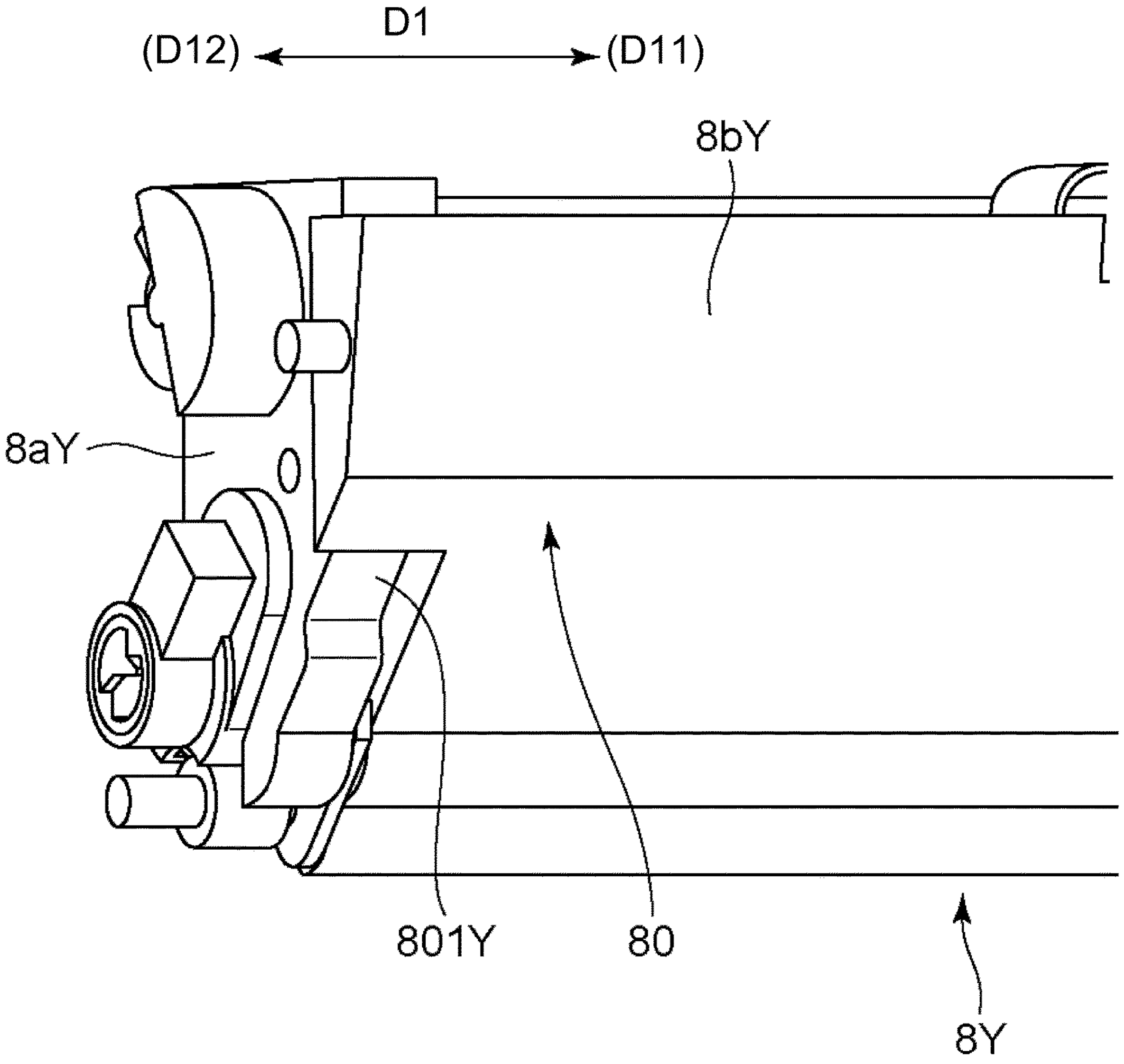

FIG. 9 is a schematic perspective view showing one end portion of the developing cartridge in the embodiment of the present invention.

Figure 10:
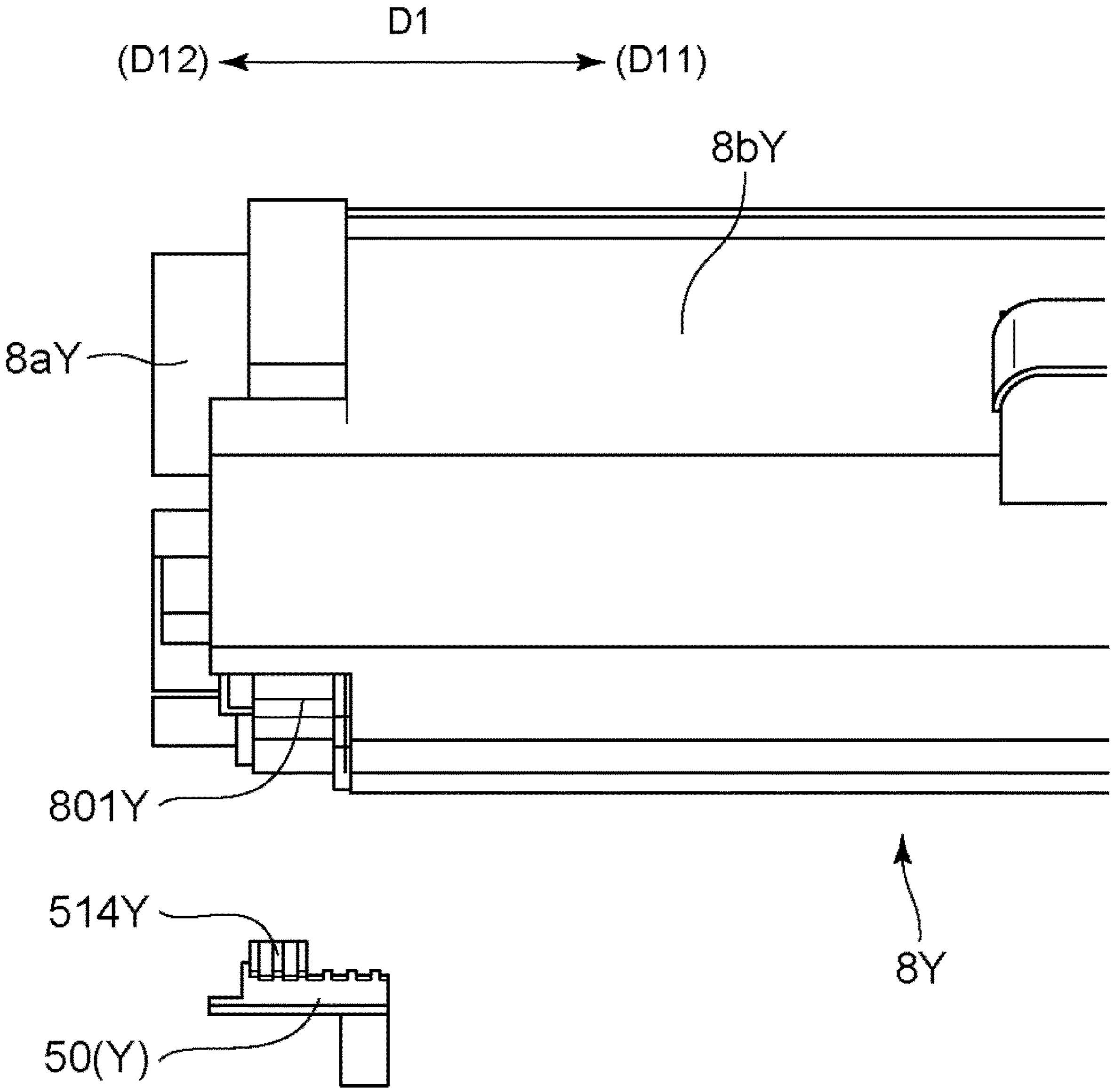

FIG. 10 is a schematic top (plan) view showing a positional relationship between the developing cartridge and the cleaning member in the embodiment of the present invention.

Figure 11:
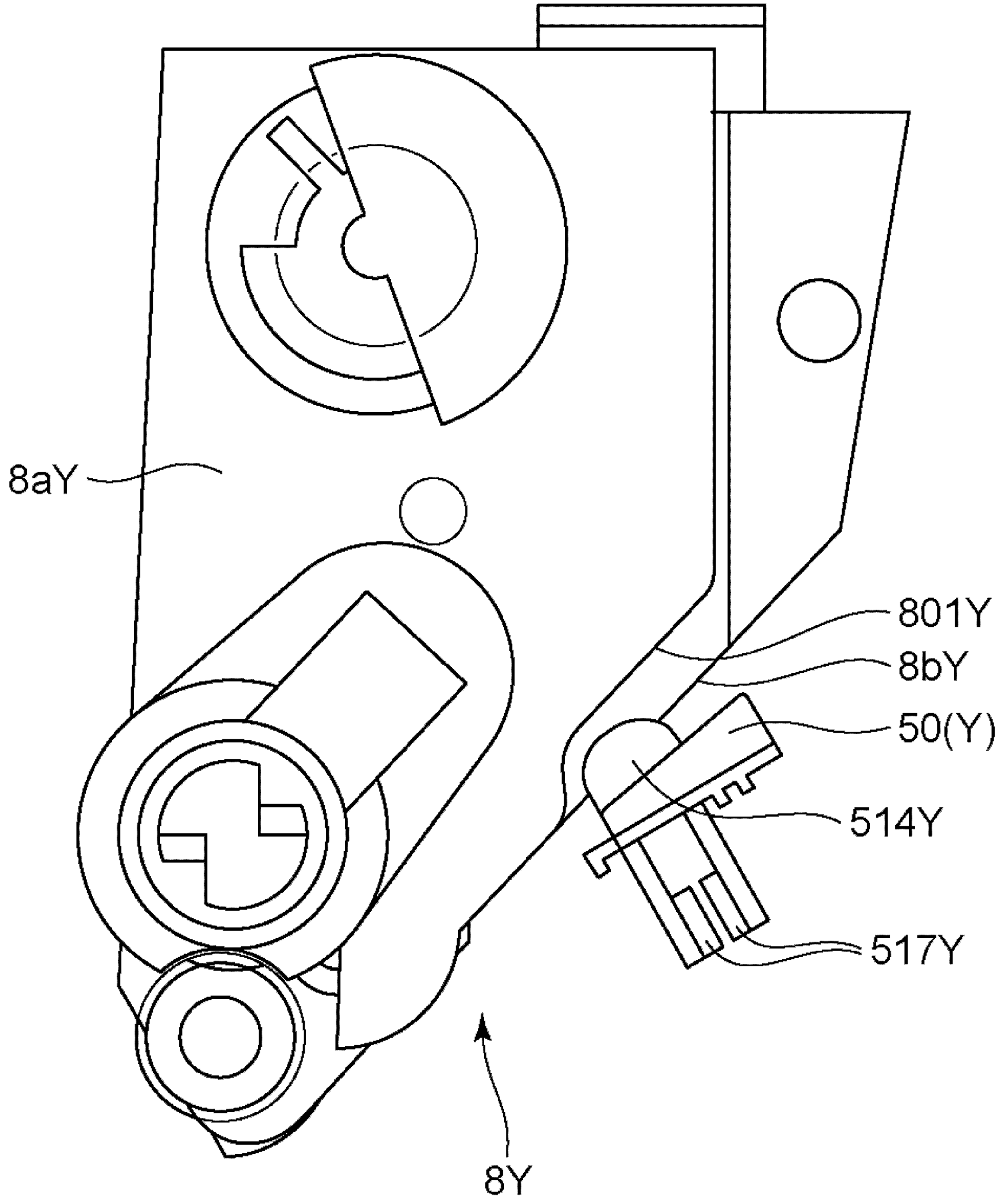

FIG. 11 is a schematic sectional view showing the positional relationship between the developing cartridge and the cleaning member in the embodiment of the present invention.

Figure 12:
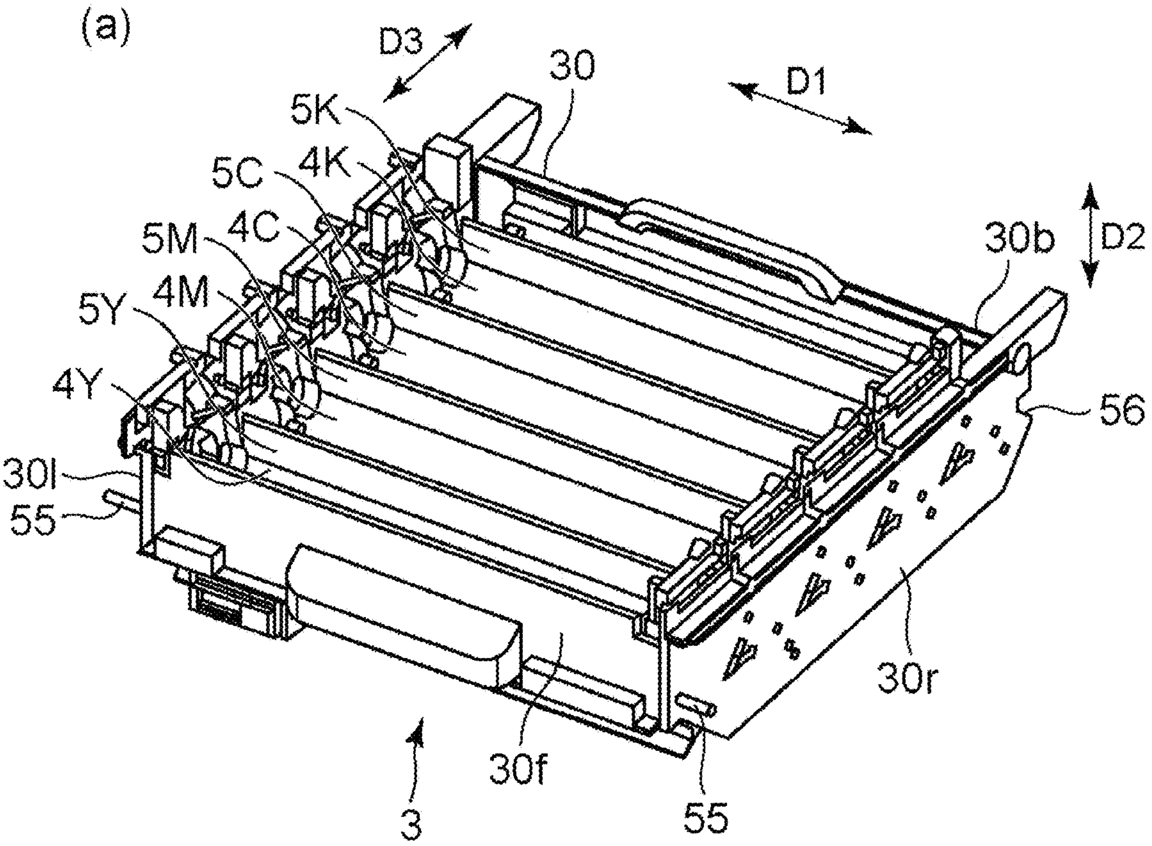
Figure 12:
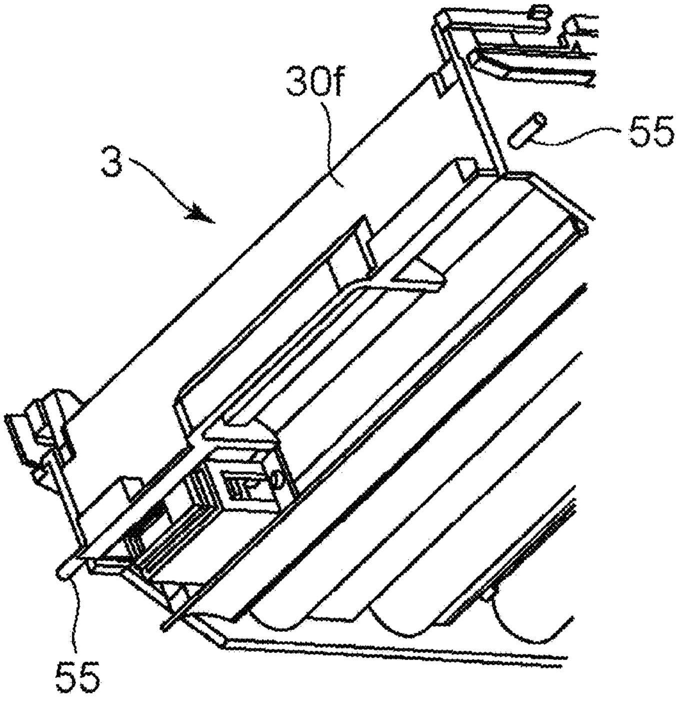

Part (a) of FIG. 12 is a schematic perspective view of the cartridge tray in the embodiment of the present invention, and part (b) of FIG. 12 is a schematic perspective view of a front portion of the cartridge tray in the embodiment of the present invention.

Figure 13:
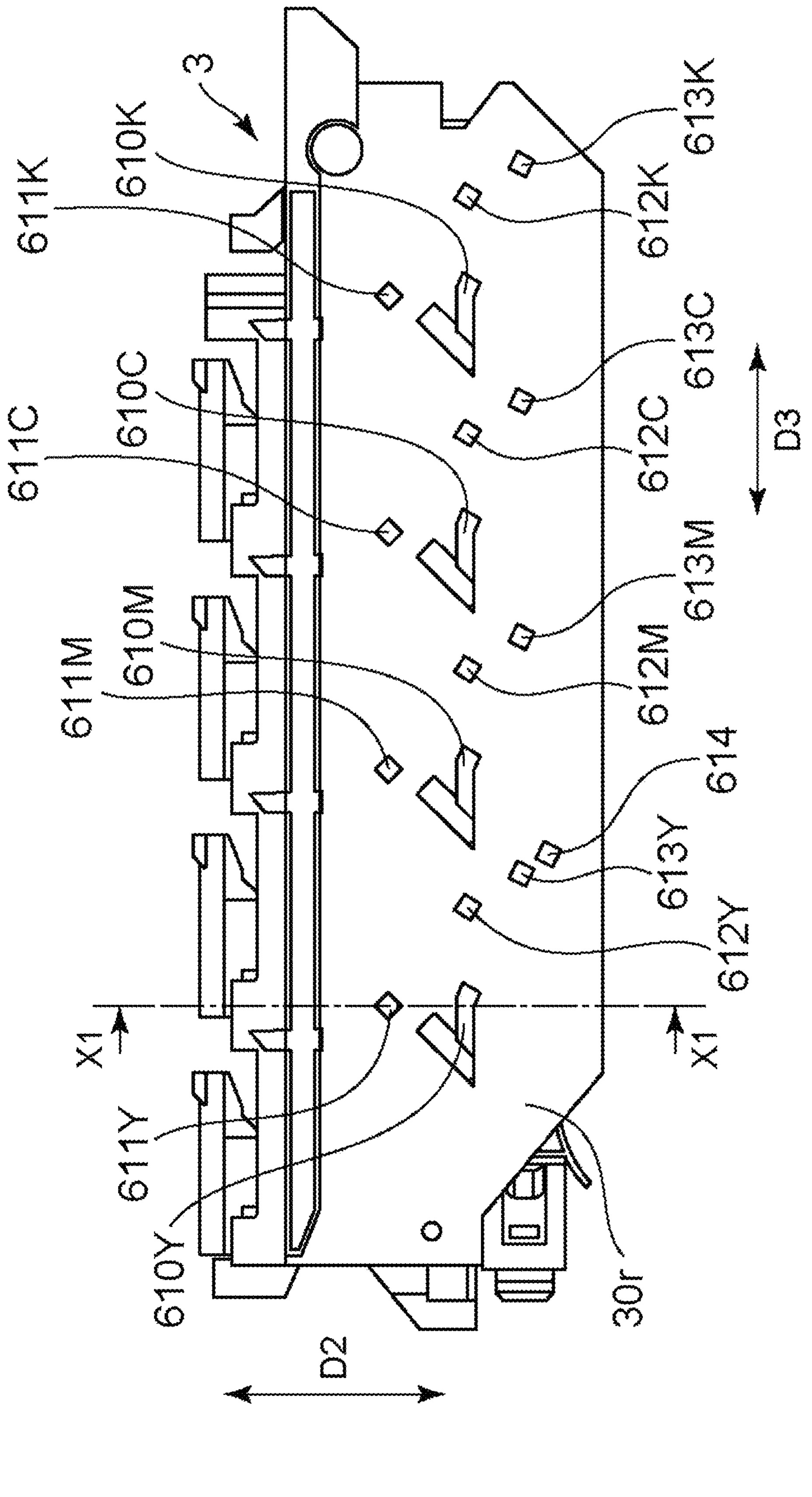

FIG. 13 is a schematic side view of the cartridge tray on one side in the embodiment of the present invention.

EMBODIMENTS OF THE INVENTION

In the following, with reference to the drawings, embodiments for carrying out the present invention will be specifically described. However, as regards functions, materials, shapes, relative arrangement, and the like of constituent elements described below, a scope of the present invention is not intended to be limited thereto unless otherwise specified. Further, in the following description, the functions, the materials, the shapes, and the like which have been once described are similar to those in the first description unless otherwise specified again.

Further, in the following description, with respect to an image forming apparatus, a side where a front door is provided is referred to as a front side, and a side opposite from the front side is referred to as a rear side in some cases. Further, when the image forming apparatus is viewed from the front side, a left-hand side is referred to as a left side, and a right-hand side is referred to as a right side in some cases.

Further, a direction in which a member extends in a drum axis of a photosensitive drum included in a cartridge tray is defined as a first direction and is referred to as a "D1 direction". Further, a direction (in this embodiment, an inserting direction of a developing cartridge into the cartridge tray) crossing the D1 direction is defined as a second direction and is referred to as a "D2 direction". In addition, a direction in which the cartridge tray is inserted into the image forming apparatus is defined as a third direction and is referred to as a "D3 direction".

The D1 direction and the D2 direction cross each other, preferably are perpendicular to each other. The D2 direction and the D3 direction cross each other, preferably are perpendicular to each other. The D3 direction and the D1 direction cross each other, preferably are perpendicular to each other.

EMBODIMENT

General Structure

First, the image forming apparatus of an embodiment of the present invention will be described using FIGS. 1 to 13.

Figure 1:
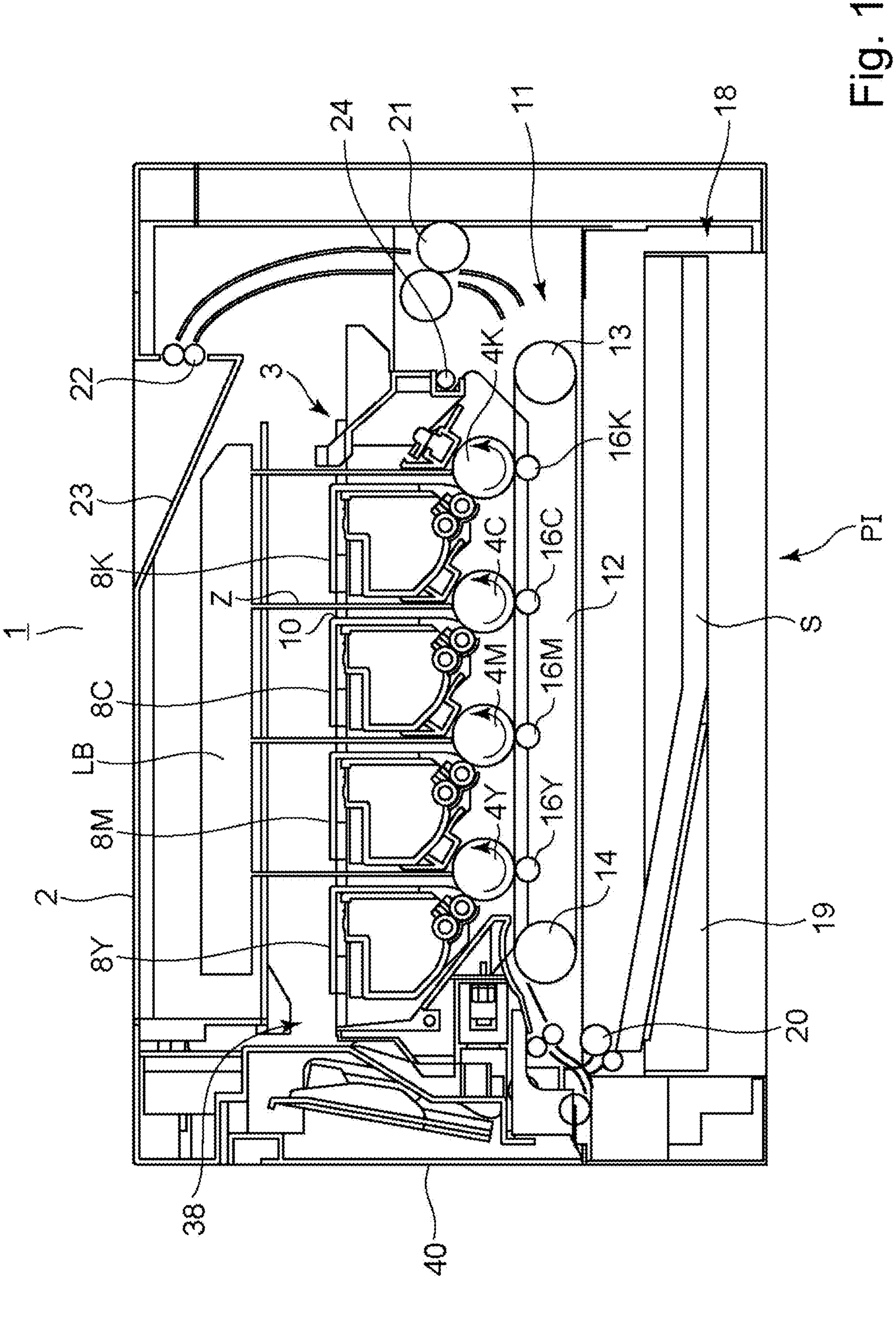
FIG. 1 is a schematic sectional view of an image forming apparatus according to an embodiment of the present invention.

FIG. 1 is a schematic sectional view of the image forming apparatus according to the embodiment of the present invention.

In this embodiment, an image forming apparatus 1 is a full-color laser beam printer which uses an electrophotographic image forming process and which is based on four colors (Y, M, C, K), and forms a color image on a sheet S.

As shown in FIG. 1, the image forming apparatus 1 includes an apparatus main assembly 2, a cartridge tray (movable member) 3, and four developing cartridges (cartridges) 8 (8Y, 8M, 8C, 8K).

The cartridge tray 3 and the developing cartridges 8 are mounted so as to be mountable in and dismountable from the apparatus main assembly 2. The cartridge tray 3 is a tray capable of holding the four developing cartridges 8. The cartridge tray 3 and the developing cartridges 8 constitute a pulling-out unit 38.

Incidentally, in the following, the cartridge tray 3 in a state in which the four developing cartridges 8 are mounted is also simply referred to as the cartridge tray 3 in some cases. That is, the cartridge tray (movable member) 3 of the present invention constitutes at least a part of the pulling-out unit 38.

The cartridge tray 3 (the pulling-out unit 38) is movable between an image forming position as a first position PI where a photosensitive drum is capable of forming an image and a pulling-out position as a second position PO where the developing cartridge 8 is exposed to an outside of the apparatus main assembly 2.

The image forming apparatus 1 forms the image on the sheet S (for example, print sheet) by a developer (for example, toner) supplied from the developing cartridge 8.

In this embodiment, the four developing cartridges 8 are mounted in a single cartridge tray 3. The four developing cartridges 8 accommodates developers (hereinafter, also referred to as toner) of colors (for example, respective colors of yellow Y, magenta M, cyan C, black K) which are different from each other. However, the number of the developing cartridges 8 mounted on the cartridge tray 3 may also be 1 to 3 and may also be 5 or more.

Incidentally, the developing cartridges 8 have a substantially similar constitution except for the colors of toner images. For this reason, a constitution of the developing cartridge 8Y (yellow) will be principally described as a representative example. Incidentally, a difference from other developing cartridges 8 (8M, 8C, 8K) will be described timely.

FIG. 4 is a schematic sectional view of the cartridge tray (3) and the developing cartridge (8Y) in the embodiment of the present invention.

As shown in FIG. 4, in the cartridge tray 3, a photosensitive drum 4Y carrying the toner image and rotating about a rotational axis extending in the D1 direction is provided. That is, the D1 direction is an axial direction of the rotational axis of the photosensitive drum 4Y. In addition, the cartridge tray 3 includes a charging unit 5Y (charging member) acting on the photosensitive drum 4Y, and a first cleaning roller 7Y and a second cleaning roller 9Y.

The charging unit 5Y is a corona charger of a scorotron type, and includes a charging wire 5*a*Y (5*a*) and a grid electrode 51*b*Y. The developing cartridge 8Y includes a developing roller 6Y for developing an electrostatic latent image on the photosensitive drum 4Y.

In FIG. 1, above the cartridge tray 3, a laser scanner unit LB is provided. This laser scanner unit LB outputs laser light Z corresponding to image information. The laser light Z passes through an exposure window portion 10 and subjects a surface of the photosensitive drum 4 to scanning exposure.

Under the developing cartridges 8 and the cartridge tray 3, an electrostatic attraction belt unit 11 is provided. This electrostatic attraction belt unit 11 includes a driving roller 13 and a tension roller 14, and an electrostatic attraction belt 12 having plasticity is extended around the driving roller 13 and the tension roller 14. The photosensitive drums 4 (4Y, 4M, 4C, 4K) provided in the cartridge tray 3 contact an upper surface of the electrostatic attraction belt 12.

Inside the electrostatic attraction belt 12, transfer rollers 16 (16Y, 16M, 16C, 16K) are provided at positions opposing the photosensitive drums 4. The toner images carried on the photosensitive drums 4 are transferred onto the sheet S by applying a transfer bias to the transfer rollers 16.

Below the electrostatic attraction belt unit 11, a feeding unit 18 is provided. This feeding unit 18 includes a feeding tray 19 in which sheets S are stacked and accommodated, and a feeding roller 20, and feeds the sheet S. On a rear side (right side of FIG. 1) of the electrostatic attraction belt unit 11, a fixing unit 21 for fixing the image on the sheet S is disposed, and at an upper portion of the apparatus main assembly 2, a discharging unit 22 for discharging the sheet S to an outside of the image forming apparatus is disposed.

Part (a) of FIG. 2 is a schematic perspective view of the image forming apparatus according to the embodiment of the present invention. Part (b) of FIG. 2 is a schematic perspective view of the image forming apparatus in a state in which the cartridge tray is dismounted.

As shown in part (a) of FIG. 2, the cartridge tray 3 is provided so as to be movable in the D3 direction along guiding rails 41 (see part (b) of FIG. 2) provided in the apparatus main assembly 2 after a front door 40 of the image forming apparatus 1 is opened. The developing cartridges 8 are individually exchangeable relative to the cartridge tray 3.

The apparatus main assembly 2 is provided with an opening 25 through which a pulling out unit 38 passes. The front door 40 is supported by the apparatus main assembly 2 so as to be movable between a closed position where the front door 40 covers the opening 25 and an open position where the opening 25 is open.

FIG. 3 is a schematic perspective view of the cartridge tray 3 and the developing cartridges 8 in the embodiment of the present invention. Specifically, in FIG. 3, the cartridge tray 3 and the developing cartridges 8 according to this embodiment are shown. Particularly, in FIG. 3, a state in which a specific one developing cartridge 8C is dismounted from the cartridge tray 3 is shown. Incidentally, in four slots (mounting portions) 31, mounting and dismounting of the developing cartridges 8 are carried out.

Image Forming Operation

Next, an image forming operation will be described using FIGS. 1 and 4.

Incidentally, in the image forming apparatus 1 of the present invention, an operation for forming a full-color image is performed as follows. As regards the cartridge tray 3 and the developing cartridges 8, mounting thereof into the image forming apparatus 1 is completed in a state in which the front door 40 is closed.

When the front door 40 is closed, unshown drum driving couplings provided in the image forming apparatus 1 engage with drum coupling 54 (54Y, 54M, 54C, 54L) (see FIG. 3) connected to the photosensitive drums 4.

Each of the drum couplings 54 is rotationally driven via an unshown drive output motor and an unshown gear of the image forming apparatus 1. The associated photosensitive drum 4 is rotationally driven in an arrow direction of FIG. 1 at a predetermined speed via the drum coupling 54.

The electrostatic attraction belt 12 is also rotationally driven at a speed corresponding to the speed of the photosensitive drum 4.

At this time, the laser scanner unit LB is driven and emits light. In synchronism with the light emission of the laser scanner unit LB, surfaces of the photosensitive drums 4 are electrically charged uniformly to a predetermined polarity and a predetermined potential by the charging units (charging members) 5 (5Y, 5M, 5C, 5K). The laser scanner unit LB subjects the surfaces of the photosensitive drums 4 to scanning exposure to the laser light Z depending on image signals for the respective colors. By this, electrostatic latent images depending on the image signals for the corresponding colors are formed on the surfaces of the photosensitive drums 4.

The electrostatic latent image formed on the photosensitive drum 4Y is developed by the developing roller 6Y rotationally driven in an arrow E direction of FIG. 4 at a predetermined speed. A supplying roller 70Y is rotationally driven in an arrow F direction in a state in which the supplying roller 70Y contacts a surface of the developing roller 6Y. A stirring member 71Y includes a shaft member 71*a*Y and a sheet member 71*b*Y, and is rotationally driven in an arrow G direction.

By such an electrophotographic image forming process, on the photosensitive drum 4Y, a yellow toner image corresponding to a yellow component of the full-color image is formed. On the other hand, the sheets S are separated and fed one by one at a predetermined control timing by the feeding unit 18. Then, the sheet S is conveyed along the photosensitive drums 4 by the electrostatic attraction belt 12.

The sheet S reaches the photosensitive drum 4Y at a predetermined control timing, and the toner image on the photosensitive drum 4Y is transferred onto the sheet S. Similarly, on other photosensitive drums 4 (4M, 4C, 4K), toner images corresponding to the colors of magenta, cyan and black are formed. Then, these toner images are superposed transferred onto the yellow toner image on the sheet S in the order of the toner images of magenta, cyan and black. Thus, the full-color (unfixed) toner image based on the four colors of yellow, magenta, cyan and black is formed on the sheet S.

The toner image transferred on the sheet S is fixed by the fixing unit 21. Then, the sheet S passed through the fixing unit 21 is discharged onto a discharge tray 23 by the discharging unit 22.

Residual toner and paper powder which remain on the photosensitive drum 4Y are physical and electrically removed from the photosensitive drum 4Y by the first cleaning roller 7Y. A part of the residual toner is held on the first cleaning roller 7Y, and another part of the residual toner is charged by the first cleaning roller 7Y and then is returned onto the photosensitive drum 4Y. The residual toner returned to the photosensitive drum 4Y is returned to the developing roller 6Y. The paper dust is physically and electrically removed from the first cleaning roller 7Y by the second cleaning roller 9Y.

Constitution of Cartridge Tray

Next, a constitution of the cartridge tray 3 will be described using FIGS. 12 and 13.

Part (a) of FIG. 12 is a schematic perspective view of the cartridge tray 3 in the embodiment of the present invention. Part (b) of FIG. 12 is a schematic perspective view of a front portion of the cartridge tray 3. FIG. 13 is a schematic side view of the cartridge tray on one side in the embodiment of the present invention.

The cartridge tray 3 includes a tray frame 30 (frame), slots 31 (mounting portion), penetrating shafts 55, the photosensitive drums 4 (image bearing members), the charging units 5, and cleaning frames 27 (27Y, 27M, 27C, 27K) (see FIG. 4).

As shown in part (a) of FIG. 12, the tray frame 30 comprises four surfaces of the right side surface 30*r*, a left side surface 301, a front surface 30*f*, and a rear (back) surface 30*b*. The right side surface 30*r* is positioned outside the cartridge tray 3 with respect to the D1 direction and covers a right side of the cartridge tray 3. Similarly, the left side surface 301 is positioned outside the cartridge tray 3 with respect to the D1 direction and covers a left side of the cartridge tray 3. Further, the front surface 30*f* and the rear surface 30*b* are surfaces connecting the right side surface 30*r* and the left side surface 301, and the front surface 30*f* is positioned on the front side of the cartridge tray 3 and the rear surface 30*b* is positioned on the rear side of the cartridge tray 3.

The penetrating shafts 55 are supported by the right side surface 30*r* and the left side surface 301, and end portions thereof project from the right side surface 30*r* and the left side surface 301 toward the outsides with respect to the D1 direction. Further, on the rear side of the right side surface 30*r* and the left side surface 301, positioning grooves 56 are formed (the positioning groove 56 on the left side surface 301 side is not shown). Here, the penetrating shafts 55 are supported by shaft engaging portions 57 of the apparatus main assembly 2 shown in part (b) of FIG. 2, and the positioning grooves 56 are supported by positioning shafts 24 of the apparatus main assembly 2 shown in FIG. 1. By this, the cartridge tray 3 is positioned relative to the apparatus main assembly 2.

As shown in part (a) of FIG. 12, the photosensitive drums 4 are supported by the right side surface 30*r* and the left side surface 301, and are mounted so as to be rotatable about rotation shafts extending in the D1 direction. The charging units 5 and the cleaning frames 27 (see FIG. 4) are integrally supported by the right side surface 30*r* and the left side surface 301.

As shown in FIG. 13, on the right side surface 30*r*, tray developing contacts 610 (610Y, 610M, 610C, 610K) are provided. Further, similarly, on the left side surface 30*r*, first tray charging contacts 611 (611Y, 611M, 611C, 611K) and second tray charging contacts 612 (612Y, 612K, 612C, 612K) are provided. Similarly, on the right side surface 30*r*, first tray cleaner contacts 613 (613Y, 613M, 613C, 613K) and a second tray cleaner contact 614 are provided.

The tray developing contacts 610, the first tray charging contacts 611, and the second tray charging contacts 612 contact unshown contacts of the apparatus main assembly 2, so that voltages are supplied thereto. Similarly, the first tray cleaner contacts 613 and the second tray cleaner contact 614 also contact unshown contacts of the apparatus main assembly 2, so that voltages are supplied thereto.

Next, electrical connection will be specifically described with reference to FIGS. 13 and 4 by using the constitution for the yellow (Y) as a representative example similarly.

The tray charging contacts 610 are electrically connected to the developing rollers 6 (6Y, 6M, 6C, 6K), respectively.

The first tray charging contacts 611 are electrically connected to the charging wires 5*a* (5*a*Y, 5*a*M, 5*a*C, 5*a*K), respectively. The second tray charging contacts 612 are electrically connected to the grid electrodes 5*b* (5*b*Y, 5*b*M, 5*b*C, 5*b*K), respectively.

The first tray cleaner contacts 613 is electrically connected to the first cleaning rollers 7 (7Y, 7M, 7C, 7K) which extend in the D1 direction and which are each rotatable about rotation shaft, respectively.

The second tray cleaner contact 614 is electrically connected to the second charging roller 9Y.

In this embodiment, the cleaning rollers 7 and 9 are used, but a constitution in which removal of the residual toner and the paper dust is carried out by a rubber blade or a sheet may also be employed.

Cleaning Member

Next, a constitution of a cleaning member 50Y will be described using FIGS. 4 to 8. In the following, similarly, description will be made by using the constitution for the yellow (Y) as a representative example. For convenience of explanation, the description will be made by omitting a symbol "Y" in some cases.

FIG. 5 is a schematic perspective view of the cartridge tray 3 and the cleaning member 50Y (partially enlarged) in the embodiment of the present invention.

FIG. 6 is a schematic perspective view of the charging member 5Y and the cleaning member 50Y in the embodiment of the present invention. Specifically, in FIG. 6, a state in which the cleaning member 50Y is in a cartridge mountable position is shown.

Parts (a) and (b) of FIG. 7 are schematic perspective views of the cleaning member 50Y in the embodiment of the present invention.

FIG. 8 is a top (plan) view of the cartridge tray 3 and the cleaning member 50Y (partially enlarged) in the embodiment of the present invention.

As described above, the cartridge tray 3 in this embodiment is movable between the first position PI where the cartridge tray 3 is positioned inside the image forming apparatus 1 and the second position PO where the cartridge tray 3 is pulled out to the outside of the image forming apparatus 1. Further, the cartridge tray 3 is capable of moving while mounting the developing cartridges 8 each provided with a recessed portion 801 (predetermined recessed portion) in the neighborhood of an end portion with respect to a longitudinal direction (axial direction D1).

Further, the cartridge tray 3 includes the tray frame 30, the slot 31 provided in the frame and to which the cartridge is detachably mountable, the rotatable photosensitive drum 4 provided in the frame, and the charging unit 5 for electrically charging a peripheral surface of the photosensitive drum 4. Incidentally, the charging unit 5 is disposed so as to extend along the axial direction D1 of a rotation shaft (rotational axis) L1 of the photosensitive drum 4.

In this embodiment, the cartridge tray 3 is movable between an end portion 501 provided in the frame on one side (D11) of the frame with respect to the axial direction D1 and an end portion 502 provided in the frame on the other side (D12) of the frame with respect to the axial direction D1, and includes the cleaning member 50 disposed close to the charging member and for cleaning the charging member.

In this embodiment, the cleaning member 50 is constituted by a base portion 51 and a projected portion 514.

Incidentally, the base portion 51 includes a first surface 511 positioned on the one side (D11) and crossing the axial direction D1, a second surface 512 positioned on the two other side (D12) and crossing the axial direction D1, and a third surface 513 positioned between the first surface 511 and the second surface 512 with respect to the axial direction D1.

Specifically, in this embodiment, the first surface 511 and the second surface 512 are two side surfaces crossing (perpendicular to) the axial direction D1 in an attitude of the cleaning member 50 during use, and the third surface 513 is a top surface positioned between the first surface 511 and the second surface 512 and connecting the first surface 511 and the second surface 512. When the developing cartridge is mounted in the cartridge tray, the third embodiment 513 opposes the cartridge.

Incidentally, the first to third surfaces 511 to 513 may be flat surfaces or curved surfaces such that the flat surfaces are deformed so as to be provided with grooves (or ribs). Further, in this embodiment, the third surface 513 is positioned between the first surface 511 and the second surface 512 and may only be required to be disposed so as to cross the first surface 511 and the second surface 512.

The projected portion 514 is formed so as to project from the third surface 513 toward an outside (a side where the developing cartridge to be mounted is provided). In a state in which the cleaning member 50 is positioned at the end portion of the frame on one side, when the cartridge is mounted in the mounting portion, the projected portion 514 is capable of entering the recessed portion 801.

In this embodiment, the projected portion 514 includes a first side surface 516 crossing the axial direction D1 and positioned on the other side, and the first side surface 516 is positioned between the first surface 511 and the second surface 512 with respect to the axial direction D1. That is, the first side surface 516 positioned on the same side as the second surface 512 is disposed at a position retracted from a position of the second surface 512 (toward the one side (D11)) in the axial direction D1.

By this, as described later, when a user operates the projected portion 514, a risk such that the user touches the charging unit 5 (charging wire 5*a*) is remarkably reduced. That is, when the user grips the first side surface 516 and a second side surface 515 of the projected portion 514, a fingertip (tip of figure) of the user on the other side (D12) facing the opening 801 is capable of touching a part of the third surface 513 (top surface) of the base portion 51. For this reason, by feeling or the like of the fingertip positioned on the other side (D12), an opportunity that the user touches the second surface 512 (side surface) of the base portion 51 becomes small, and consequently, a risk that the user touches the charging wire 5*a* positioned on a further rear side (the opening 801 side) is also alleviated.

Particularly, with respect to the axial direction D1, when the first side surface 516 is retracted from the second surface 512 in a further distant direction, the risk that the user touches the charging wire 5*a* can be further alleviated. For example, the first side surface 516 of the projected portion 514 may also be disposed so as to be positioned between the first surface 511 and a center position 51*cp* of the base portion 51.

In this embodiment, the projected portion 514 further includes the second side surface 515 crossing the axial direction D1 and positioned on one side (D11). With respect to the axial direction D1, the second side surface 515 is disposed so as to be positioned between the first surface 511 and the second surface 512.

Further, the charging unit 5 includes the charging wire 5*a*. The frame 30 is provided with an opening 301 where the charging wire 5*a* is exposed, so that the cleaning member 50 can be disposed in the neighborhood of the charging wire 5*a* through the opening 301. In the following, the cleaning member 50Y will be specifically described.

As shown in FIGS. 5 and 6, the cleaning member 50Y is disposed at an upper portion of the charging unit 5Y. The cleaning member 50Y is provided so as to be movable at least in a range of an image print region with respect to the D1 direction.

As shown in FIGS. 4 to 6 and 8, the cleaning member 50Y is engaged with guiding portions 5*d*Y provided at the upper portion of the charging unit 5Y, and is movable in the D1 direction between an end portion 501Y of the charging wire 5*a*Y on one side and an end portion 502Y of the charging wire 5*a*Y on the other side. Here, the guiding portions 5*d*Y have a projected shape and support portions-to-be-engaged 518Y having a recessed shape. When the cleaning member 50Y is positioned at the end portion 501Y on one side, the developing cartridge 8Y is mountable in the cartridge tray 3Y at a mountable position.

As shown in FIGS. 6 and 7, the cleaning member 50Y includes the projected portion 514Y as a projected portion projecting from the third surface 513Y, and includes cleaning portions 517Y for cleaning the charging wire 5*a*Y while sandwiching the charging wire 5*a*Y therebetween. The projected portion 514Y includes, as described above, the second side surface 515Y positioned on one side and the first side surface 516Y positioned on the other side. When a contaminant is attracted (adsorbed) to the charging wire 5*a*Y, there is a possibility that image defect occurs. The cleaning portions 517Y wipe off the contaminant itself, whereby the occurrence of the image defect is prevented.

As shown in FIGS. 4 and 6, an upper portion of the charging wire 5*a*Y of the charging unit 5Y is open, and the cleaning member 50 is disposed close to the charging wire 5*a*Y.

As shown in FIG. 8, with respect to the D1 direction, the first side surface 516Y of the projected portion 514Y on a left side in the figure is disposed closer to a right side end portion than the second side surface 512Y of the cleaning member 50 on the left side in the figure is. Here, in FIG. 8, the right side is a side where the aforementioned end portion 501Y on one side is disposed, and the left side is a side where the aforementioned end portion 502Y on the other side is disposed.

That is, the projected portion 514Y is disposed such that the first side surface 516Y positioned on the other side is closer to the first surface 511Y (the right-side end portion in FIG. 8) than the second surface 512Y positioned similarly on the other side is. Here, in this embodiment, one side refers to a side where the drum coupling 54Y is provided. By this positional relationship, as shown in FIG. 6, when the cleaning member 50 is in a cartridge mountable position (the right side in FIG. 8), the projected portion 514Y is positioned on a side opposite from a side, with respect to the D1 direction, where the charging wire 5*a*Y is viewed through the opening 801.

When the developing cartridge 8Y is exchanged, the cleaning member 50Y is positioned at the cartridge mountable position in many cases. Further, the upper portion of the charging wire 5*a*Y is open, so that there is a liability that the user erroneously touches the charging wire 5*a*Y when the user moves and operates the cleaning member 50Y from the cartridge mountable position. In the present invention, the projected portion 514Y which is easily gripped by the user when the user operates the cleaning member 50 is disposed at the aforementioned position, so that it is possible to reduce a possibility that the user erroneously touches the charging wire 5*a*Y.

Mounting of Developing Cartridge

Next, mounting of the developing cartridge 8 into the cartridge tray 3 will be described using FIGS. 9 to 11.

The constitution for the yellow (Y) will be described as a representative example. For convenience of explanation, description will be made by omitting the symbol "Y" in some cases.

FIG. 9 is a schematic perspective view of one end portion of the developing cartridge 8Y in the embodiment of the present invention.

FIG. 10 is a schematic plan view showing a positional relationship between the developing cartridge 8Y and the cleaning member 50 (with respect to the D1 direction) in the embodiment of the present invention.

FIG. 11 is a schematic sectional view showing the positional relationship between the developing cartridge 8Y and the cleaning member 50 in the embodiment of the present invention. Specifically, in FIG. 11, the positional relationship between the developing cartridge 8Y and the cleaning member 50 when the developing cartridge 8Y is mounted in the cartridge tray 3.

In this embodiment, the cartridge tray 3 is capable of restricting mounting of a developing cartridge with a "difference specification" from the developing cartridge with a particular specification suitable for the image forming operation. That is, in a state in which the cleaning member 50 is positioned at the end portion 501 of the frame 30 on one side, when the developing cartridge with the "different specification" is mounted in the slot 31, the projected portion 514 cannot enter the recessed portion 801 and contacts the developing cartridge. By this, it is possible to prevent the mounting of the developing cartridge with the "different specification".

Specifically, as shown in FIGS. 9 and 10, a frame 80 of the developing cartridge 8Y includes a toner accommodating container 8*b*Y and a cover portion 8*a*Y provided at an end portion of the toner accommodating container 8*b*Y with respect to the longitudinal direction.

The cover member 8*a*Y is provided with the recessed portion 801Y at an overlapping position with the projected portion 514Y of the cleaning member 50 with respect to the DI direction when the developing cartridge 8Y is mounted in the cartridge tray 3.

As shown in FIG. 11, in the state in which the developing cartridge 8 is mounted in the cartridge tray 3, the recessed portion 801Y and the projected portion 514Y of the cleaning member 50 are not in contact with each other and are in a state in which these portions are spaced from and opposed to each other. At this time, when the projected portion 514Y is viewed in a rotational axis direction (a direction parallel to the D1 direction) of the developing roller, the projected portion 514Y does not overlap with a cover member 8*a* Y but overlaps with the toner accommodating container 8*b*Y. Thus, by providing the recessed portion 801Y on the cover member 9*a*Y, not the toner accommodating container 9*b*Y, an effect of largely ensuring a space for the toner accommodating container 8*b*Y is obtained.

In the case where the developing cartridge with the different specification is mounted in the cartridge tray 3, the projected portion 514Y of the cleaning member 50 and the developing cartridge are in contact with each other, so that mounting of the developing cartridge with the different specification can be prevented.

The present invention can be summarized as follows.

(1) The movable member 3 of the present invention is movable between the first position PI positioned inside the image forming apparatus 1 and the second position PO pulled out to the outside of the image forming apparatus 1, and is capable of moving while mounting the cartridge 8 provided with the predetermined recessed portion 801.

Further, the movable member 3 includes the frame 30, the mounting portion 31 provided in the frame and to which the cartridge is detachably mountable, the rotatable image bearing member 4 provided in the frame, the charging member 5 provided in the frame and not only extending along the axial direction D1 of the rotation shaft (rotational axis) L1 of the image bearing member but also for electrically charging the surface of the image bearing member, and the cleaning member 50 provided in the frame and movable between the end portion 501 of the frame on one side with respect to the axial direction and the end portion 502 of the frame on the other side with respect to the axial direction, the cleaning member 50 being disposed close to the charging member and being used for cleaning the charging member.

The cleaning member 50 includes the base portion 51 and the projected portion 514.

The base portion 51 includes the first surface 511 positioned on one side and crossing the axial direction D1, the second surface 512 positioned on the other side and crossing the axial direction D1, and the third surface 513 positioned between the first surface 511 and the second surface 512 with respect to the axial direction D1.

The projected portion 514 is the projected portion projecting from the third surface 513 toward the outside and is capable of entering the recessed portion when the cartridge is mounted in the mounting portion in the state in which the cleaning member is positioned at the end portion of the frame on one side.

The projected portion 514 includes the first side surface 516 crossing the axial direction and positioned on the other side and the second side surface 515 crossing the axial direction and positioned on one side, and the first side surface 516 is positioned between the first surface 511 and the second surface 512 with respect to the axial direction.

The first side surface 516 constitutes the end surface of the projected portion 514 on the other side with respect to the axial direction, and the second side surface 515 constitutes the end surface of the projected portion 514 on one side with respect to the axial direction.

By this, when the user operates the projected portion 514, the risk that the user touches the charging member can be alleviated.

(2) In the movable member 3 of the present invention, with respect to the axial direction, the first side surface 516 of the projected portion 514 may also be disposed so as to be positioned between the first surface 511 and the center position 51*cp* of the base portion 51.

By this, when the user operates the projected portion, the risk that the user touches the charging member can be further alleviated.

(3) In the movable member 3 of the present invention, with respect to the axial direction D1, the second side surface 515 may also be disposed so as to be positioned between the first surface 511 and the second surface 512.

By this, when the user once releases his (her) fingers from the projected portion and then grips the projected portion again with his (her) fingers during movement of the projected portion by the user, it is also possible to alleviate the risk that the user touches the charging member.

(4) In the movable member 3 of the present invention, the charging member 5 is capable of including the charging wire 5*a*. The frame 30 is capable of being provided with the opening 301 through which the charging wire 5*a* is exposed. The cleaning member 50 may also be disposed in the neighborhood of the charging wire through the opening.

(5) In the movable member 3 of the present invention, mounting of the cartridge different in specification from the cartridge with the particular specification can be restricted. That is, when the cartridge 8 is mounted in the mounting portion 31 in the state in which the cleaning member 50 is positioned at the end portion 501 of the frame 30 on one side, the projected portion 514 may also be constituted so that the projected portion 514 does not enter the recessed portion 801 but contacts the cartridge 8.

(6) In the movable member 3 of the present invention, the cartridge 8 includes the developer carrying member 6 and the developing frame 80 rotatably supporting the developer carrying member 6, and the recessed portion 801 may also be provided in the developing frame 80.

(7) In the movable member 3 of the present invention, after the developer image is transferred from the image bearing member 4, the developer remaining on the image bearing member 4 may also be collected by the developer carrying member 6.

(8) In the movable member 3 of the present invention, the mounting portion 31 is capable of including a plurality of the mounting portions 31 so that a plurality of the image bearing members 4 arranged in parallel along the axial direction D1 are mountable in and dismountable from the mounting portions 31, respectively.

(9) In the movable member 3 of the present invention, the cartridge 8 may also be constituted so as to be mountable in and dismountable from the mounting portion 31 along the direction D2 crossing the axial direction D1.

(10) The image forming apparatus 1 of the present invention includes the aforementioned movable member 3, the aforementioned cartridge 8, and the aforementioned fixing member 21, and is capable of forming the image.

According to the present invention, it is possible to alleviate the risk that the user contacts the charging member when the user operates the cleaning member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-173317 filed on Oct. 14, 2020, which is hereby incorporated by reference herein in its entirety.

What is claimed is:

1. A drum unit configured to be mountable on a main assembly of an image forming apparatus, and movable to the main assembly in a state in which a plurality of developing cartridges including developing rollers are mounted thereon, the drum unit comprising:

a frame;

a plurality of photosensitive drums including a first photosensitive drum rotatably supported by the frame;

a charging wire extending along a rotational axial direction of the first photosensitive drum and configured to electrically charge a surface of the first photosensitive drum; and a cleaning member configured to be movable between an end portion of the frame on one side with respect to the rotational axial direction and an end portion of the frame on the other side with respect to the rotational axial direction along the charging wire in the rotational axial direction, and configured to clean the charging wire by moving while being in contact with the charging wire, wherein when the cleaning member is positioned at the end portion of the one side, of the plurality of the developing cartridges, a first developing cartridge corresponding to the first photosensitive drum is configured to be mountable on the drum unit, wherein the cleaning member includes:

a base portion;

a cleaning portion projected downward from the base portion in a case in which the drum unit takes a mounted attitude of being mounted on the main assembly and configured to contact and clean the charging wire; and a plurality of projected portions projected upward from the base portion in the mounted attitude and including a first projected portion which is projected highest from the base portion, and wherein an entirety of the first projected portion is provided at a position different from the cleaning portion in the rotational axial direction and the first projected portion is provided on a side close to the end portion of the frame on the one side relative to the cleaning portion in the rotational axial direction.

2. The drum unit according to claim 1, wherein the projected portions are on a plane crossing the rotational axial direction and provided with a first side surface positioned on the other side in the rotational axial direction, and wherein the first side surface is provided on the one side rather than the cleaning member in the rotational axis direction.

3. The drum unit according to claim 1, wherein a highest projected portion of the first projected portion is provided on a center portion of the first projected portion in a direction perpendicular to the rotational axial direction.

4. The drum unit according to claim 1, wherein the frame is provided with an opening configured to expose the charging wire, and wherein the cleaning member is movable along the opening in the rotational axial direction.

5. The drum unit according to claim 1, wherein when the developing cartridge is mounted in a state in which the cleaning member is positioned at the end portion of the frame on the one side, mounting another developing cartridge different in specification from the developing cartridge with a particular specification is restricted by contact of the first projected portion with the developing cartridge without entering a recessed portion formed on the developing cartridge.

6. The drum unit according to claim 1, wherein the developing cartridge includes a developing frame rotatably supporting the developing roller, and wherein the recessed portion is provided in the developing frame.

7. The drum unit according to claim 6, wherein a developer remaining on the photosensitive drum after a developer image is transferred from the photosensitive drum is collected by the developing roller.

8. The drum unit according to claim 1, further comprising a plurality of mounting portions provided in the frame and on which the developing cartridges are mountable, wherein each of the mounting portions is a groove portion having a groove shape.

9. The drum unit according to claim 1, wherein the plurality of the developing cartridge are mounted on the plurality of the mounting portions in a state of being arranged along a direction crossing the rotational axial direction.

10. An image forming apparatus for forming an image, comprising:

a drum unit according to claim 1;

the developing cartridge; and a fixing member.

* * * * *